(12) United States Patent
Xu

(10) Patent No.: US 8,160,823 B2
(45) Date of Patent: Apr. 17, 2012

(54) CONTACT PRESSURE AND POSITION DETECTING DEVICE AND DETECTING METHOD FOR SAME

(75) Inventor: Zhong Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 278 days.

(21) Appl. No.: 12/636,797

(22) Filed: Dec. 14, 2009

(65) Prior Publication Data
US 2011/0010114 A1    Jan. 13, 2011

(30) Foreign Application Priority Data
Jul. 13, 2009    (CN) .......................... 2009 1 0304297

(51) Int. Cl.
*G01L 7/00*    (2006.01)
(52) U.S. Cl. ................ 702/50; 702/41; 702/94; 702/95; 702/98
(58) Field of Classification Search .................... 702/41, 702/50, 57, 94–95, 98, 138–140; 345/173; 178/18.03; 73/730, 774, 828, 820, 825, 862.381, 73/862.451, 862.625–862.642
See application file for complete search history.

(56) References Cited

U.S. PATENT DOCUMENTS

| | | | |
|---|---|---|---|
| 2006/0284858 A1* | 12/2006 | Rekimoto | 345/173 |
| 2008/0143683 A1* | 6/2008 | Hotelling | 345/173 |
| 2008/0296073 A1* | 12/2008 | McDermid | 178/18.05 |
| 2009/0009482 A1* | 1/2009 | McDermid | 345/173 |
| 2010/0052880 A1* | 3/2010 | Laitinen et al. | 340/407.2 |
| 2010/0060608 A1* | 3/2010 | Yousefpor | 345/174 |

FOREIGN PATENT DOCUMENTS

JP    09244789 A    *    9/1997

* cited by examiner

*Primary Examiner* — Eliseo Ramos Feliciano
*Assistant Examiner* — Yaritza H Perez Bermudez
(74) *Attorney, Agent, or Firm* — Altis Law Group, Inc.

(57) ABSTRACT

A contact pressure and position detecting device includes a first sensing layer, a second sensing layer located on the first sensing layer, and a processor. The first sensing layer includes a number of parallel first pipes, and the second sensing layer includes a number of parallel second pipes perpendicular to the first pipes. Each first pipe includes a first pressure sensor received therein for generating a first electrical signal according to the gas pressure therein. Each second pipe includes a second pressure sensor received therein for generating a second electrical signal according to the gas pressure therein. The processor compares the first electrical signals with a first threshold value, and the second electrical signals with a second threshold value to judge which first pipe and second pipe is pressed, and then obtains the contact position on the detecting device.

13 Claims, 2 Drawing Sheets

CONTACT PRESSURE AND POSITION DETECTING DEVICE AND DETECTING METHOD FOR SAME

BACKGROUND

1. Technical Field

The present disclosure relates to pressure detecting devices and, particularly, to a contact pressure and position detecting device and a detecting method for the same.

2. Description of Related Art

Typically, a pressure sensor includes a metal stem having a diaphragm, a semiconductor substrate attached to a surface of the diaphragm, and strain gauges for converting any deformity in the diaphragm into electrical signals. This type of pressure sensor is complex in structure and costly.

What is needed, therefore, is a contact pressure and position detecting device with a simple structure to overcome or at least mitigate the above-described problem.

BRIEF DESCRIPTION OF THE DRAWINGS

Many aspects of the present contact pressure and position detecting device and detecting method thereof can be better understood with reference to the accompanying drawings. The components in the drawings are not necessarily drawn to scale, the emphasis instead being placed upon clearly illustrating the principle of the present contact pressure and position detecting device and detecting method thereof. In the drawings, all the views are schematic.

DETAILED DESCRIPTION

Embodiments of the present disclosure will now be described in detail below, with reference to the accompanying drawings.

Figure 1:
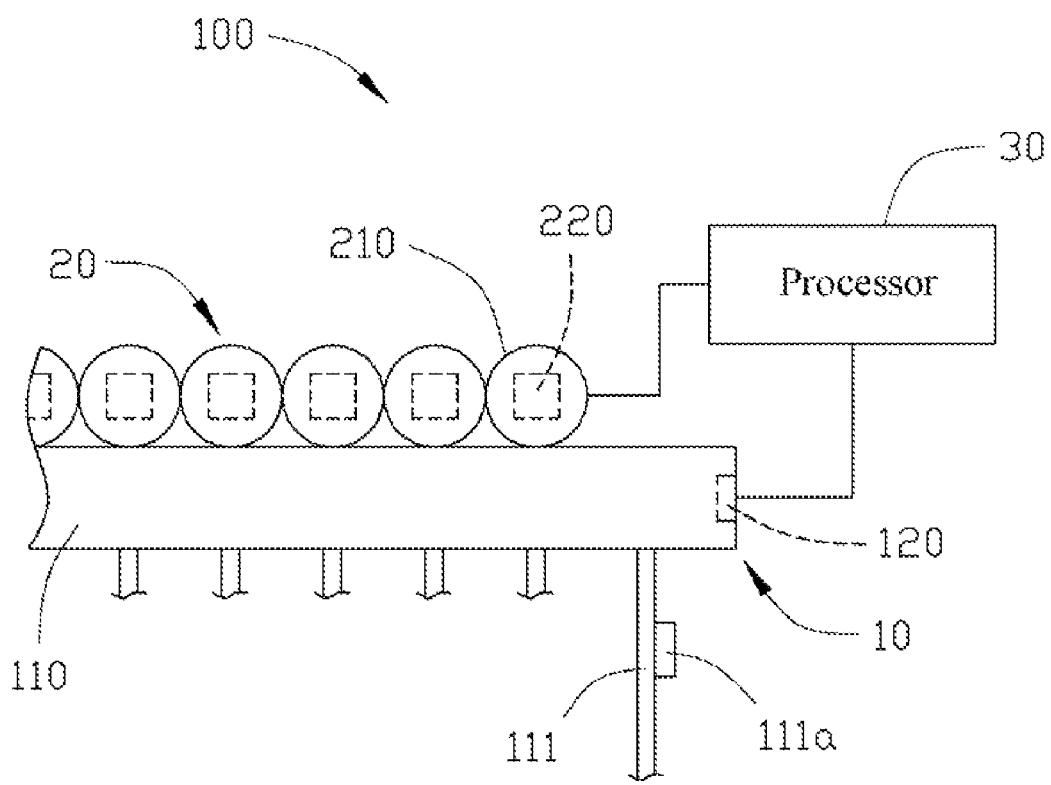
FIG. 1 is a schematic, cross-sectional view of a contact pressure and position detecting device according to an exemplary embodiment.
Figure 2:
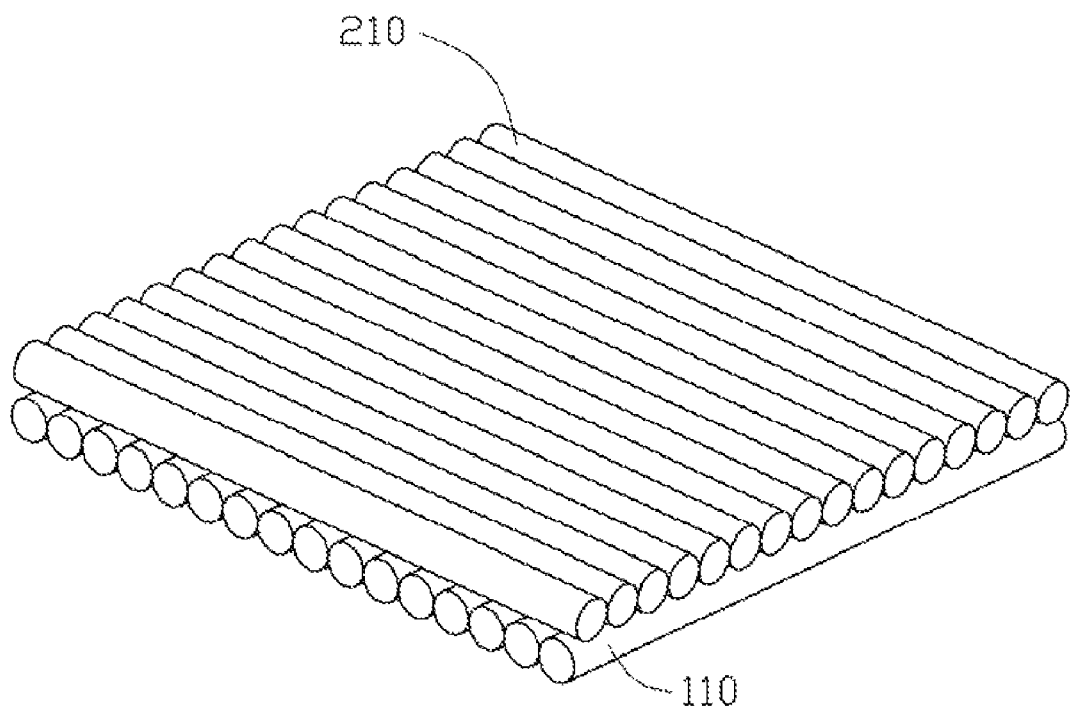
FIG. 2 is a schematic view of gas pipes of the detecting device of FIG. 1.

Referring to FIGS. 1 and 2, a contact pressure and position detecting device 100 according to an exemplary embodiment, is shown. The detecting device 100 includes a first sensing layer 10, a second sensing layer 20, and a processor 30. The detecting device 100 can be used as a touch pad of a notebook computer, etc.

The first sensing layer 10 includes a number of first pipes 110. The first pipes 110 are arranged parallel and against each other along a first direction. Each of the first pipes 110 is made of flexible material with a gas (not visible) sealed therein. Each first pipe 110 includes a first pressure sensor 120 received therein for sensing the gas pressure in the first pipe 110, and converting the gas pressure into a first electrical signal, such as current or voltage. When pressure is applied against the first pipe 110, the gas pressure in the first pipe 110 rises, thus, the value of the first electrical signal generated by the first pressure sensor 120 increases. In the present embodiment, the first pressure sensor 120 is fixed to an end of the first pipe 110. The first pipe 110 is made of polyvinylchloride.

The second sensing layer 20 is located on a surface of the first sensing layer 10. The second sensing layer 20 includes a number of second pipes 210. The second pipes 210 are arranged parallel and against each other along a second direction. The second direction is substantially perpendicular to the first direction. Each second pipe 210 is made of flexible material with a gas (not visible) sealed therein. Each second pipe 210 includes a second pressure sensor 220 received therein for sensing the gas pressure in the second pipe 210, and converting the gas pressure into a second electrical signal, such as current or voltage. When pressure is applied against the second pipe 210, the gas pressure in the second pipe 210 will increase, accordingly, the value of the second electrical signal generated by the second pressure sensor 220 will increase. In the present embodiment, the second pressure sensor 220 is fixed to an end of the second pipe 210. The second pipe 210 is made of polyvinylchloride.

The processor 30 is electrically connected with each of the first pressure sensors 120 of the first pipes 110 and each of the second pressure sensors 220 of the second pipes 210. The processor 30 stores a first threshold value, and a second threshold value. The second threshold value can be equal to or different from the first threshold value. Preferably, the second threshold value is bigger than the first threshold value. In the present embodiment, the second sensing layer 20 is disposed on the top of the first sensing layer 10, that is, a contact pressure will first act on the second sensing layer 20 before the first sensing layer 10 is affected by deformation of the second pipes 210 of the second sensing layer 20.

The processor 30 is configured for comparing the first electrical signals generated by the first pressure sensors 120 with the first threshold value to judge which first pipe/pipes are applied a contact pressure, and comparing the second electrical signals generated by the second pressure sensors 220 with the second threshold value to judge which second pipe/pipes are applied contact pressure. If the first electrical signal generated by the first pressure sensor 120 is bigger than the first threshold value, the processor 30 will judge that the first pipe 110 corresponding to the first pressure sensor 120 is being pressed or touched. If the second electrical signal generated by the second pressure sensor 220 is bigger than the second threshold value, the processor 30 will judge that the second pipe 210 corresponding to the second pressure sensor 220 is pressed or touched.

Because the first pipes 10 are perpendicular to the second pipes 20, the processor 30 can obtain the contact position on the detecting device 100 according to the pressed first pipe 110 and second pipe 210, and display the result on a display (not shown).

In the present embodiment, the detecting device 100 further includes a number of third pipes 111 connected to the first pipes 110 and the second pipes 210 for pumping into or removing gas out of the first pipes 110 and the second pipes 210. Each of the third pipes 111 includes a valve 111a.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A contact pressure and position detecting device comprising:
   a first sensing layer comprising a plurality of first pipes which are parallel and against each other, each first pipe being made of flexible material with a gas sealed therein, each first pipe comprising a first pressure sensor received therein for generating a first electrical signal according to the gas pressure in the first pipe;
   a second sensing layer located on the first sensing layer, the second sensing layer comprising a plurality of second pipes which are parallel and against each other and substantially perpendicular to the plurality of first pipes, each second pipe being made of flexible material with a gas sealed therein, each second pipe comprising a second pressure sensor received therein for generating a second electrical signal according to the gas pressure in the second pipe; and a processor electrically connected with each of the first pressure sensors of the first pipes and each of the second pressure sensors of the second pipes, the processor being configured for comparing the first electrical signals generated by the first pressure sensors with a first threshold value to judge which first pipe/pipes are pressed, and comparing the second electrical signals generated by the second pressure sensors with a second threshold value to judge which second pipe/pipes are pressed, the processor further obtaining the contact position on the detecting device according to the pressed first pipes and second pipes.

2. The detecting device of claim 1, wherein the detecting device is used as a touch pad of a notebook computer.

3. The detecting device of claim 1, wherein the first pressure sensor is fixed to an end of the first pipe.

4. The detecting device of claim 1, wherein the first pipe is made of polyvinylchloride.

5. The detecting device of claim 1, wherein the second pressure sensor is fixed to an end of the second pipe.

6. The detecting device of claim 1, wherein the second pipe is made of polyvinylchloride.

7. The detecting device of claim 1, wherein each of the first electrical signal and the second electrical signal is selected from a group consisting of current and voltage.

8. The detecting device of claim 1, wherein the first threshold value and the second threshold value are stored in the processor.

9. The detecting device of claim 1, wherein the first threshold value is equal to the second threshold value.

10. The detecting device of claim 1, wherein the second threshold value is bigger than the first threshold value.

11. The detecting device of claim 1, wherein if the first electrical signal generated by the first pressure sensor is bigger than the first threshold value, the processor will judge that the first pipe corresponding to the first pressure sensor is pressed.

12. The detecting device of claim 1, wherein if the second electrical signal generated by the second pressure sensor is bigger than the second threshold value, the processor will judge that the second pipe corresponding to the second pressure sensor is pressed.

13. The detecting device of claim 1, wherein the detecting device further comprises a plurality of third pipes connected to the first pipes and the second pipes for pumping into or removing gas out of the first pipes and the second pipes.

* * * * *